United States Patent
Haines et al.

(10) Patent No.: US 11,598,546 B2
(45) Date of Patent: Mar. 7, 2023

(54) OCCUPANCY SENSING AND BUILDING CONTROL USING MOBILE DEVICES

(71) Applicant: Trane International Inc., Davidson, NC (US)

(72) Inventors: Paul Edmund Haines, Maple Grove, MN (US); Thomas A. Fletcher, St. Paul, MN (US); Bryan Kinney, Stillwater, MN (US); John C. Olson, Shoreview, MN (US)

(73) Assignee: Trane International Inc., Davidson, NC (US)

( * ) Notice: Subject to any disclaimer, the term of this patent is extended or adjusted under 35 U.S.C. 154(b) by 96 days.

(21) Appl. No.: 15/538,546

(22) PCT Filed: Dec. 22, 2015

(86) PCT No.: PCT/US2015/067288
§ 371 (c)(1),
(2) Date: Jun. 21, 2017

(87) PCT Pub. No.: WO2016/106287
PCT Pub. Date: Jun. 30, 2016

(65) Prior Publication Data
US 2018/0004178 A1     Jan. 4, 2018

Related U.S. Application Data

(60) Provisional application No. 62/095,381, filed on Dec. 22, 2014.

(51) Int. Cl.
*G05B 15/02*     (2006.01)
*F24F 11/63*     (2018.01)
(Continued)

(52) U.S. Cl.
CPC .............. *F24F 11/63* (2018.01); *F24F 11/61* (2018.01); *F24F 11/62* (2018.01); *F24F 11/65* (2018.01);
(Continued)

(58) Field of Classification Search
CPC .................. G05B 19/048; G05B 15/02; G05B 2219/2625; G05B 2219/2642;
(Continued)

(56) References Cited

U.S. PATENT DOCUMENTS 7,116,988 B2   10/2006   Dietrich et al.
7,382,271 B2   6/2008   McFarland
(Continued)

FOREIGN PATENT DOCUMENTS

WO    2013158866 A1   10/2013

OTHER PUBLICATIONS

Chinese First Office Action, CN Application No. 201580070454.9, dated Jul. 1, 2019.
(Continued)

*Primary Examiner* — Michael D Masinick
(74) *Attorney, Agent, or Firm* — Womble Bond Dickinson (US) LLP

(57) ABSTRACT

Apparatus, systems and methods for ascertaining the occupancy of a building are presented. The building is divided into one or more control zones which correspond to physical areas of the building associated with controllable modules, such as HVAC units, lighting, irrigation, or other environmental features such as fountains, music, video, and the like. Zone parameters define how zone devices shall react to the number of occupants located in the particular zone. A building control system detects individual mobile devices in and around the building, and determines the locations of each device by using trilateration and/or location services.

(Continued)

The identified mobile devices act as proxies for building occupants. The locations of these devices are correlated with the locations of the zones in the building, and the building control system then adjusts the operating parameters of the zone based on the number of devices present in the zone.

20 Claims, 6 Drawing Sheets

(51) Int. Cl.
| | |
|---|---|
| F24F 11/62 | (2018.01) |
| H04W 4/021 | (2018.01) |
| F24F 11/65 | (2018.01) |
| F24F 11/61 | (2018.01) |
| G05B 19/048 | (2006.01) |
| F24F 120/10 | (2018.01) |
| H04W 4/38 | (2018.01) |
| H04W 4/33 | (2018.01) |
| F24F 11/57 | (2018.01) |
| F24F 11/64 | (2018.01) |
| F24F 120/12 | (2018.01) |
| F24F 130/00 | (2018.01) |
| F24F 130/10 | (2018.01) |
| F24F 110/10 | (2018.01) |

(52) U.S. Cl.
CPC .......... *G05B 15/02* (2013.01); *G05B 19/048* (2013.01); *H04W 4/021* (2013.01); *F24F 11/57* (2018.01); *F24F 11/64* (2018.01); *F24F 2110/10* (2018.01); *F24F 2120/10* (2018.01); *F24F 2120/12* (2018.01); *F24F 2130/00* (2018.01); *F24F 2130/10* (2018.01); *G05B 2219/2614* (2013.01); *G05B 2219/2625* (2013.01); *G05B 2219/2642* (2013.01); *H04W 4/33* (2018.02); *H04W 4/38* (2018.02)

(58) Field of Classification Search
CPC ... G05B 2219/2614; F24F 11/62; F24F 11/65; F24F 11/30; F24F 11/61; F24F 2120/10; F24F 11/57; F24F 11/64; F24F 2120/12; F24F 2130/00; F24F 2130/10; F24F 2110/10; H04W 4/021; H04W 4/38; H04W 4/33
See application file for complete search history.

(56) References Cited

U.S. PATENT DOCUMENTS

| 8,174,931 | B2 | 5/2012 | Vartanian et al. |
|---|---|---|---|
| 8,556,188 | B2 | 10/2013 | Steinberg |
| 8,737,279 | B1 | 5/2014 | Aweya et al. |
| 8,840,033 | B2 | 9/2014 | Steinberg |
| 9,612,589 | B1* | 4/2017 | Dawson-Haggerty ...................... G05D 23/19 |
| 9,709,292 | B2 | 7/2017 | Steinberg |
| 2011/0290893 | A1 | 12/2011 | Steinberg |
| 2012/0147862 | A1* | 6/2012 | Poojary .................. H04L 67/12 370/338 |
| 2012/0149387 | A1 | 6/2012 | Rawat et al. |
| 2013/0044043 | A1* | 2/2013 | Abdollahi ............ G01C 21/165 345/8 |
| 2013/0109406 | A1* | 5/2013 | Meador ................. H04L 67/125 455/456.1 |
| 2013/0336138 | A1* | 12/2013 | Venkatraman .......... G01S 19/48 370/252 |
| 2014/0031989 | A1 | 1/2014 | Bergman et al. |
| 2014/0039690 | A1 | 2/2014 | Steinberg |
| 2014/0074257 | A1* | 3/2014 | Bhargava ................. H04Q 9/00 700/12 |
| 2014/0243015 | A1* | 8/2014 | Basha ................. G01S 5/02524 455/456.1 |
| 2014/0266669 | A1* | 9/2014 | Fadell .................. G05B 19/042 340/501 |
| 2014/0274151 | A1* | 9/2014 | Pattabiraman ........ H04W 16/22 455/456.3 |
| 2014/0277763 | A1* | 9/2014 | Ramachandran ...... G05B 15/02 700/276 |
| 2014/0349672 | A1 | 11/2014 | Kern, Jr. et al. |
| 2015/0134085 | A1* | 5/2015 | Brissman ........... G05D 23/1932 700/66 |
| 2015/0160663 | A1* | 6/2015 | McCarthy, III .... G07C 9/00571 700/283 |
| 2015/0172872 | A1* | 6/2015 | Alsehly ................. G01S 5/0236 455/457 |
| 2015/0181549 | A1* | 6/2015 | Batada .................. H04W 64/00 455/456.1 |
| 2015/0362909 | A1* | 12/2015 | McReynolds .......... G06Q 10/04 700/275 |
| 2016/0272460 | A1* | 9/2016 | Simcik .................... B66B 1/468 |
| 2017/0276760 | A1* | 9/2017 | Alsehly ................. H04W 4/029 |
| 2018/0004178 | A1* | 1/2018 | Haines .................. H04W 4/021 |
| 2022/0272658 | A1* | 8/2022 | Kalhan ............ H04W 52/0232 |
| 2022/0317227 | A1* | 10/2022 | Issakov .................. G01S 19/45 |

OTHER PUBLICATIONS

European Examination Report, EP Application No. 15874285.8, dated Aug. 30, 2019.

Chinese Office Action (EN Translation), CN Appl. Ser. No. 201580070454.9, dated Mar. 11, 2020.

F. Alsehly et al. Indoor Positioning with floor determination in Multi Story Buildings. 2011 International Conference on Indoor Positioning and Indoor Navigation, Sep. 21-23, 2011. Guimaraes, Portugal. 5 pages.

* cited by examiner

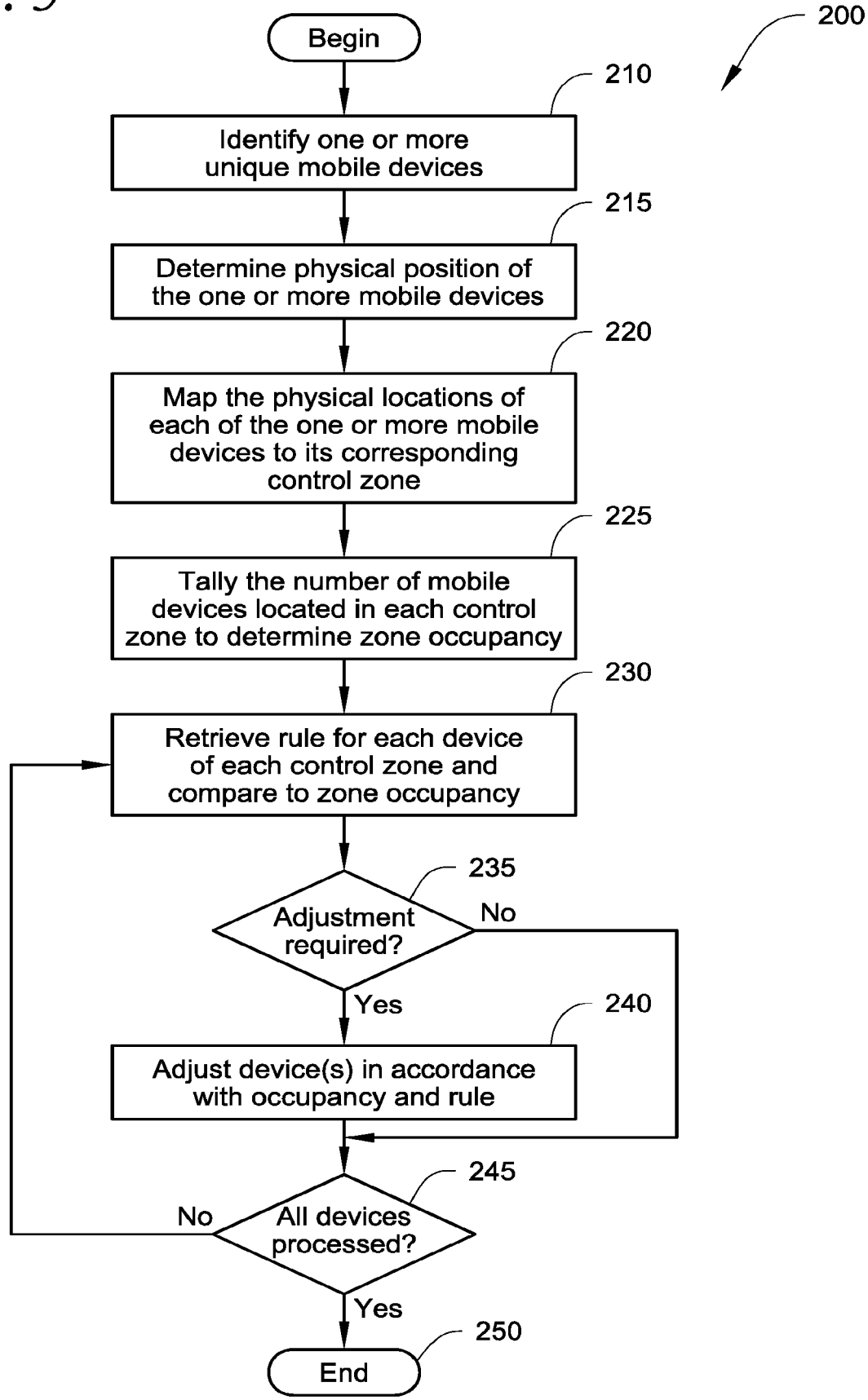

OCCUPANCY SENSING AND BUILDING CONTROL USING MOBILE DEVICES

CROSS-REFERENCE TO RELATED APPLICATIONS

This application is a U.S. National Phase Application filed under 35 U.S.C. § 371 of International Application PCT/US2015/067288 entitled "OCCUPANCY SENSING AND BUILDING CONTROL USING MOBILE DEVICES" and filed Dec. 22, 2015, which claims the benefit of and priority to U.S. Provisional Application Ser. No. 62/095,381 entitled "OCCUPANCY SENSING AND BUILDING CONTROL USING MOBILE DEVICES" and filed Dec. 22, 2014, the entireties of which are hereby incorporated by reference herein for all purposes.

BACKGROUND

1. Technical Field

The present disclosure relates generally to environmental control systems, such as heating, ventilation, and air conditioning (HVAC) systems and lighting control systems, and in particular, to improved systems and methods for sensing occupants of a building for environmental control purposes.

2. Background of Related Art

A heating, ventilation, and air conditioning (HVAC) system generally includes equipment configured to control one or more environmental conditions such as, but not limited to, temperature, humidity, air quality, or the like. An HVAC system is generally equipped with a umber of HVAC components, such as a sensors, variable air volume (VAV) boxes, air handlers, chillers, and so forth, which interact to provide the desired environmental condition within a facility. The function and control of the HVAC equipment is typically adjusted by an HVAC automation and energy management system, which may include equipment controllers, system controllers and so forth. A building's lighting control system may include timers, light sensors, passive infrared (PIR) sensors, and ultrasonic sensors to detect environmental conditions and occupancy status and, in response, turn lights on or off as required.

HVAC systems are typically controlled using static schedules which define when the building is occupied, and when the building is unoccupied. Smaller buildings, such as a residence, may have a single controlled zone which encompasses the entire habitable space of the structure. Larger buildings, such as larger residences and commercial buildings, may have multiple zones. Specialized structures, such as warehouses and cold storage facilities, may have multiple zones with distinct environmental requirements.

Known techniques currently in use for occupancy sensing may have drawbacks in that they are often costly to implement and error-prone. For example, common access control technologies rely on sensors or access devices which indicate the passage of a person through some point in a building. These techniques are unable to provide timely and accurate counts of the number of occupants at a given point in time. Such inaccuracies give rise to cumulative errors. For example, with a card access system, people frequently do not typically "badge out" of rooms. In another example, multiple people can pass through a door after the first person in line uses their access card. In yet another example, motion detectors will see multiple people walking close together as a single person, or see a single person meandering back and forth as multiple people.

Scheduling techniques for HVAC control may have drawbacks, because they do not rely on actual occupancy, but rather they rely on anticipated occupancy to control HVAC functions. Despite these limitations, the predominant method of controlling a building is to schedule the occupied and unoccupied periods for each day.

SUMMARY

In one aspect, the present disclosure is directed to a building system controller for a building which has one or more controllable devices associated with a control zone, and one or more communication access points configured to receive an electromagnetic signal from a mobile device. Each mobile device includes a unique identifier, which is included in the electromagnetic signal broadcast from the mobile device. The building system controller includes a map of the building defining one or more control zones and a map of the building indicating the location of each access point. The building system controller includes a location module, an occupancy module, and a rules processor. The location module processes the electromagnetic signal received by the one or more communication access points to determine the location of the mobile device. The occupancy module determines the number of mobile devices located within each of the control zones. The rules processor has a control output that controls a device associated with a control zone in response to, at least in part, the number of mobile devices located within the control zone.

In some embodiments of the building system controller, the rules processor includes a comparator which compares the number of mobile devices located within the control zone to a predetermined rule to determine the control output. In some embodiments, the comparator further compares the number mobile devices located within each of the control zones to a predetermined parameter selected from the group consisting of an occupancy threshold, a thermal rate, a thermal load, and a climatological condition.

In some embodiments, the control output controls a device selected from the group consisting of an HVAC component, a lighting module, an irrigation module, a status display, and a music playback device. In some embodiments, the location module includes a trilateration unit which compares the signal strength of a mobile device received from a first access point to the signal strength of the mobile device received from at least a second access point to determine the location of the mobile device. In some embodiments, the electromagnetic signal further includes a location indicator indicating the position of the mobile device, and the occupancy module is configured to determine the number of mobile devices located within each of the control zones based at least in part upon the location indicator included in the electromagnetic signal. In some embodiments, the building system controller includes a status display which presents a zone status to a user. The status display may be locally or remotely located with respect to the building system controller. The status display may display status relating to a zone identifier, the number of mobile devices located in a zone, and a current operational status of a zone. In some embodiments, the rules processor is configured to issue an alert to at least one designated user in response to, at least in part, the number of mobile devices located within the control zone. In some embodiments, the access points can be network access points or the radio-enabled HVAC equipment In another aspect, the present disclosure is directed to a building control system. The building control system includes a system controller in operative communication with at least one controllable device associated with a control zone, a geolocation module, a map of the building defining one or more control zones of the building, an occupancy module, and a rules processor. The geolocation module is operable on a mobile device in operative communication with the system controller, and provides the location of the mobile device to the system controller. The occupancy module determines, based at least in part upon the location of the mobile device, the total number of mobile devices located within each of the at least one control zones. The rules processor has a control output configured to control a controllable device of a control zone in response to, at least in part, the total number of mobile devices located within the control zone.

In some embodiments, the rules processor includes a comparator which compares the number of mobile devices located within the control zone to a predetermined rule to determine the control output. In some embodiments, the comparator further compares the number mobile devices located within each of the control zones to a predetermined parameter selected from the group consisting of an occupancy threshold, a thermal rate, a thermal load, and a climatological condition. In some embodiments, the control output of the rules processor controls a device selected from the group consisting of an HVAC component, a lighting module, an irrigation module, a status display, and a music playback device. In embodiments, the building control system includes a status display which presents a zone status to a user. The zone status includes, without limitation, a zone identifier, the number of mobile devices located in a zone, and a current operational status of a zone.

In yet another aspect, the present disclosure is directed to a method of operating a building control system. The method includes identifying one or more unique mobile devices, determining a physical location of each one of the one or more mobile devices, comparing the physical locations of each of the one or more mobile devices to a stored model of the controlled building to determine in which control zone the mobile device currently resides, tallying the number of mobile devices in each control zone to determine the occupancy of each control zone,
retrieving from a rules database a rule relating to a controlled device, evaluating the rule in view of the zone occupancy for the zone associated with the controlled device to determine if an adjustment to the controlled device is required, and adjusting the controlled device in accordance with the evaluating.

In some embodiments, determining a physical location includes trilateration of a radiofrequency communication signal broadcast by an identified one of the one or more unique mobile devices. In some embodiments, determining a physical location includes receiving a GPS location encoded within a radiofrequency communication signal broadcast by an identified one of the one or more unique mobile devices. In some embodiments, determining a physical location includes receiving an altimeter reading encoded within a radiofrequency communication signal broadcast by an identified one of the one or more unique mobile devices. In some embodiments, the evaluating step further includes evaluating the rule in view of the current time. In some embodiments, the method includes issuing an alert to a user in response to, at least in part, the occupancy of a control zone.

Other features and advantages will become apparent from the following description of the preferred embodiments, taken in conjunction with the accompanying drawings.

BRIEF DESCRIPTION OF THE DRAWINGS

Various embodiments of the disclosed system and method are described herein with reference to the drawings wherein:

FIG. 5 is a flow diagram illustrating the operation of a building control system in accordance with the present disclosure.

Figure 1:
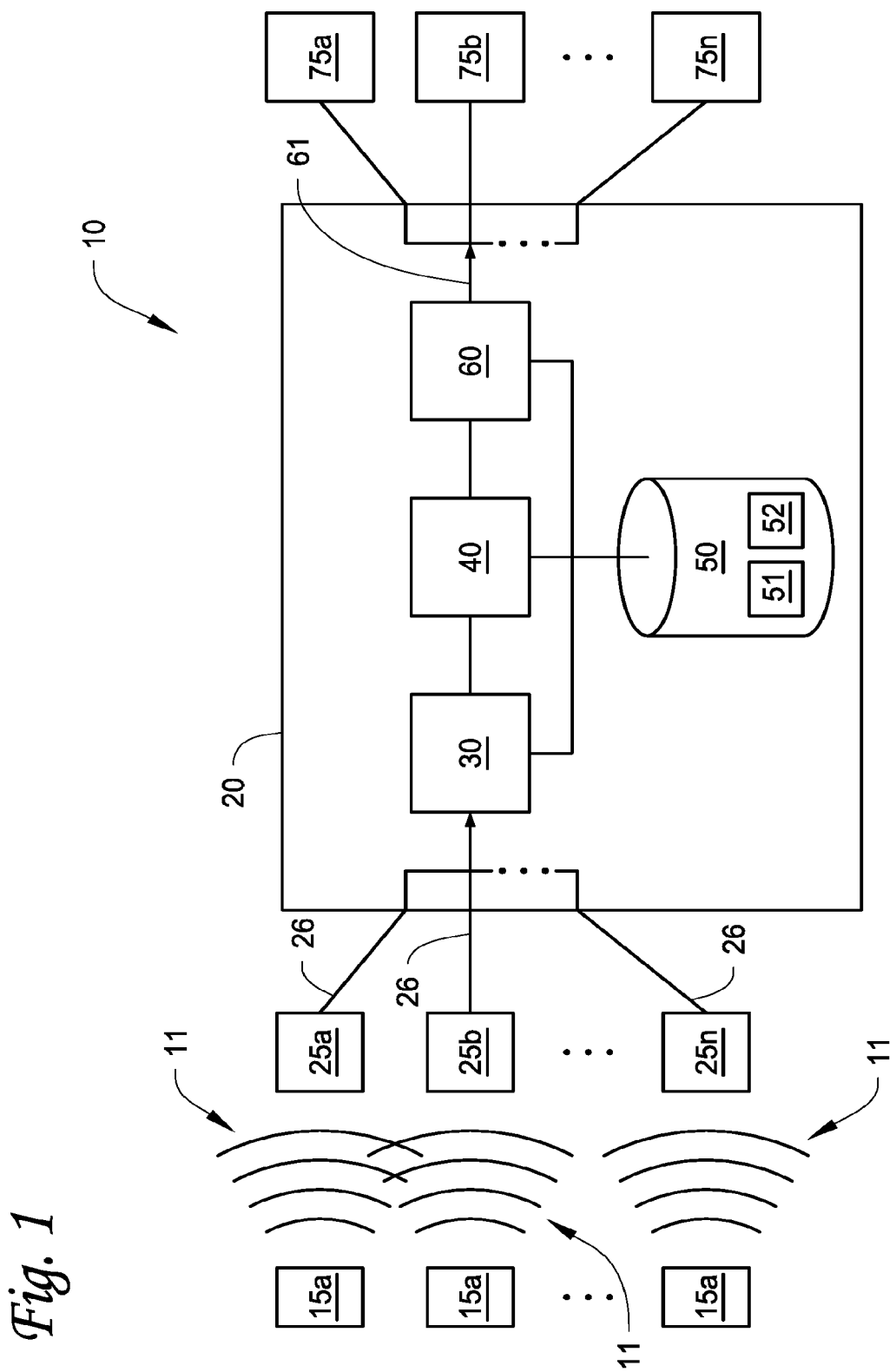
FIG. 1 is a functional diagram illustrating an embodiment of a building control system in accordance with the present disclosure.

The various aspects of the present disclosure mentioned above are described in further detail with reference to the aforementioned figures and the following detailed description.

DETAILED DESCRIPTION

Particular illustrative embodiments of the present disclosure are described hereinbelow with reference to the accompanying drawings, however, the disclosed embodiments are merely examples of the disclosure which may be embodied in various forms. Well-known functions or constructions and repetitive are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure is described herein in terms of functional block components and various processing steps. It should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C#, Java, COBOL, assembler, PERL, Python, PHP, or the like, with the various algorithms being implemented with any combination of data structures, objects, processes, routines or other programming elements. The object code created may be executed by any device, on a variety of operating systems, including without limitation Apple OSX®, Apple iOS®, Google Android®, HP WebOS®, Linux, UNIX®, Microsoft Windows®, and/or Microsoft Windows Mobile®.

It should be appreciated that the particular implementations described herein are illustrative of the disclosure and its best mode and are not intended to otherwise limit the scope of the present disclosure any way. Examples are presented herein which may include sample data items which are intended as examples and are not to be construed as limiting. Indeed, for the sake of brevity, conventional data networking, application development and other functional aspects of the systems (and components of the individual operating components of the systems) may not be described in detail herein. It should be noted that many alternative or additional functional relationships or physical or virtual connections may be present in a practical electronic system or apparatus. In the discussion contained herein, the terms user interface element and/or button are understood to be non-limiting, and include oilier user interface elements such as, without limitation, a hyperlink, a clickable image, and the like.

As will be appreciated by one of ordinary skill in the art, the present disclosure may be embodied as a method, an HVAC control system, a device for HVAC system control, and/or a computer program product. Accordingly, the present disclosure may take the form of an entirely hardware embodiment, an entirely software embodiment, or an embodiment combining aspects of both hardware and software. Furthermore, the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., flash memory, USB thumb drives) and/or the like.

Computer program instructions embodying the present disclosure may also be stored in a computer-readable memory that can direct a computer or other programmable data processing apparatus to function in a particular manner, such that the instructions stored in the computer-readable memory produce an article of manufacture, including instruction means, that implement the function specified in the description or flowchart block(s). The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the present disclosure.

One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like The steps recited herein may be executed in any order and are not limited to the order presented. Moreover, two or more steps or actions recited herein may be executed concurrently.

The disclosed systems and/or methods may be embodied, at least in part, in application software that may be downloaded, in whole or in part, from either a public or private website or an application store ("app store") to the mobile device. In another embodiment, the disclosed system and method may be included in the mobile device firmware, hardware, and/or software. In another embodiment, the disclosed systems and/or methods may be embodied, at least in part, in application software executing within a webserver to provide a web-based interface to the described functionality.

In yet other embodiments, all or part of the disclosed systems and/or methods may be provided as one or more callable modules, an application programming interface (e.g., an API), a source library, an object library, a plug-in or snap-in, a dynamic link library (e.g., DLL), or any software architecture capable of providing the functionality disclosed herein.

The present disclosure is directed to a building control system which detects the number of wireless mobile devices present in the building to determine or estimate the number of building occupants. Nearly everyone in a commercial building of today carries a mobile device having WiFi and/or Bluetooth communications capabilities, that is GPS-enabled and capable of providing location services via UPS or other techniques. One or more of the mobile devices are likely always on and constantly searching for available networks ("pinging"). There are various ways of identifying unique mobile devices in a building. For instance, each WiFi-enabled device contains a unique identifier known as a media access control address ("MAC address") and these MAC addresses are broadcast during the ping. These pings are picked up by the access points of the WiFi network situated throughout in the building. In accordance with the present disclosure, these pings are used to determine whether people are in a building, and if so, the number and location of such people. The disclosed building control system utilizes information gleaned from the devices' WiFi, GPS, accelerometer, and/or altimeter to calculate indoor coordinates to determine the locations and number of building occupants. The building control system is configured to receive the various locations of mobile devices within the building, determine when a building has become occupied and where the people are in the building, and control the lighting, heating, ventilation, and/or other environmental aspects of the building in response to how the building is occupied. By controlling a building system in accordance with actual occupancy rather than anticipated occupancy, several immediate benefits may accrue to the building owner and occupants, such as reduced energy and maintenance costs, improved equipment service life, and enhanced comfort, health and safety.

In one aspect of the present disclosure, building equipment, such as HVAC systems, lighting, and other environmental systems are typically grouped into a control model corresponding to discrete control zones or areas. These zones correspond to physical areas of the building that are controlled by the building control system. A digital physical model of a commercial building is created that faithfully reproduces the dimensions and floor plan of the actual building, including the altitude (elevation) of the floors in the building. The zones from the control model are mapped into the physical model of the building. The zones are programmed, as discussed in detail below, to operate the HVAC equipment associated with that zone in accordance with number of devices (occupants) located in the zone and with the current environmental conditions inside, and, optionally, outside the building. The building control system detects individual WiFi and location services-enabled (GPS-enabled) devices in the building by identifying their radio signatures and/or using location services that can pinpoint the location of these devices. These signatures, which serve as proxies for building occupants, are placed at the proper location within the physical model of the building by using trilateration and/or location services. The physical locations of the devices are correlated with the physical locations of the zones from the control model, and the number of devices present within the identified zones are processed by the building control system. The building control system, in turn, adjusts the operating parameters of the zone based on the number of devices present in the zone. For example, if a large number of occupants gather in a meeting room, the zone programming would increase the volume of fresh air delivered into the room. This has advantages over conventional systems which rely on $CO_2$ sensors, in that fresh air can be quickly increased as soon as the room fills with people, rather than waiting for $CO_2$ level in the room to rise to concentrations sufficient to trigger a sensor. The disclosed system is able to respond dynamically to impromptu or irregularly-occurring events, for example, office birthday parties, tour groups, and so forth, rather than relying on the rigid schedules of prior-art systems.

FIG. 1 illustrates an embodiment of a building control system 10 in accordance with the present disclosure. Examples of building control systems may be found in commonly-owned U.S. Pat. No. 8,055,386 to McCoy et al. and U.S. Pat. No. 8,290,627 to Richards et al., the disclosures of which are hereby incorporated by reference in their entireties. Building control system 10 includes a building controller 20 that is operatively coupled to at least one access point 25 via a communications link 26. Communications link 26 is typically provided by one or more network connections, for example, an Ethernet-based LAN, but it should be understood that the present disclosure is not limited to any particular type of communications link. Other suitable links, such as fiber optic, or wireless mesh network links, may be employed in various embodiments. Access point 25 includes a wireless 802.11 WiFi access point, however, in embodiments access point 25 may additionally or alternatively include a Bluetooth access point, a Beacon-enabled access point (e.g., a Bluetooth Low Energy a.k.a. BLE access point), a Near Field Communication (NFC) access point, a cellular access point (CDMA, GSM, etc.) and/or combinations thereof.

Access point 25 receives wireless communications signals 11 from one or more mobile devices 15. Each mobile device 15 includes a unique identifier, such as, without limitation, a media access control address (MAC address), an electronic serial number (ESN), and/or an international mobile equipment identifier (IMEI) that is encoded into a wireless communications signal 11 broadcast from mobile device 15. Access point 25 is configured to identify individual ones of mobile devices 15 via the unique identifier included in the signal 11 received from the device 15, in some embodiments, access point 25 is configured to identify individual ones of mobile device 15 via RF fingerprinting, e.g., by performing a spectral analysis of individual communications signals 11 to differentiate between the sources of each RF signal 11. Additionally, the one or more access points 25 are configured to detect the signal strength of each received communications signal 11. In this manner, each access point 25 is able to establish both the identity and signal strength of each mobile device 15 within range. Signal strength decreases as a function of distance between transmitter and receiver and therefore provides an indication of the distance from the mobile device 15 to the access point 25. In many instances, a communications signal from a single mobile device 15a, 15b . . . 15n is received by two or more access points 25a, 25b . . . 25n. In these instances, given the physical location of each access points 25a, 25b . . . 25n, the disclosed system attempts to determine or estimate the physical location of the identified mobile device using trilateration (also referred to as "triangulation") as discussed in more detail below. Multiple mobile devices 15 may be tracked in this manner by the one or more access points 25, which, in turn, convey the identification and signal strength data to building controller 20. The physical locations of the mobile devices 15 are then mapped to their respective control zones.

In some embodiments, a single access point 25 may be utilized. In these instances, which may be suitable for a small building or a residential setting, the number of mobile devices 15 connected to the single access point represents the occupancy of a single zone encompassing the entire building. That is, the occupancy of the building is based upon the total number of mobile devices presently within range of the single access point. In another scenario, where a single access point 25 is utilized yet multiple control zones exist, a software application 12 included in mobile device 15 receives the physical position of mobile device 15 from UPS unit 14, and transmits the received UPS position of mobile device 15 to building controller 20 via wireless communications signal 11.

Figure 4:
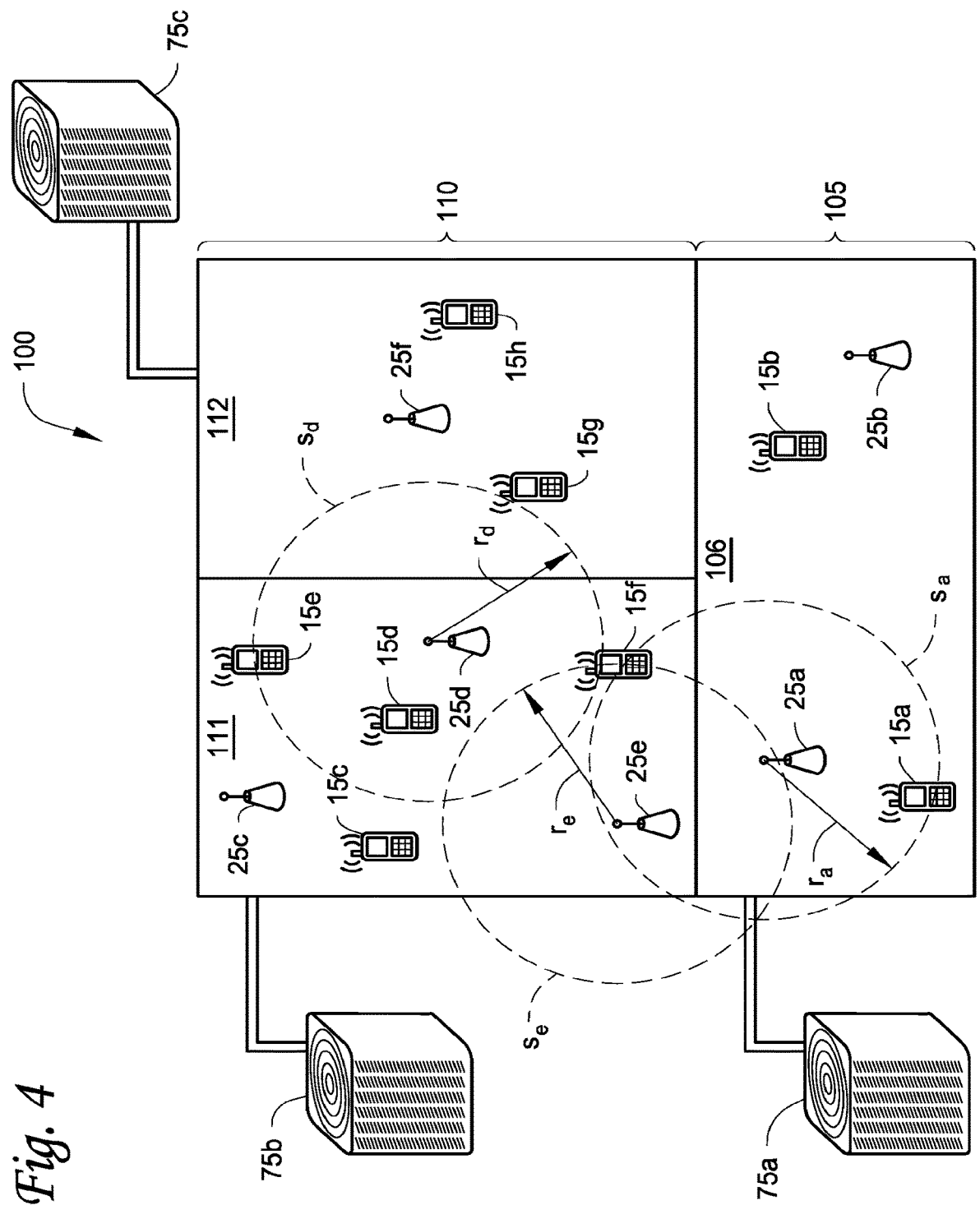
FIG. 4 is a functional diagram of a building control system in use in accordance with an embodiment of the present disclosure.

Building controller 20 includes a building database 50 in operative communication with a location module 30, an occupancy module 40, and a rules processor 60. Building database 50 includes a map 51 which indicates the locations of each access point 25, and the boundaries of each control zone 106, 111, 112 defined within a building 100 (FIG. 4). In embodiments, map 51 includes a three-dimensional digital map which represents each control zone of building 100. A control zone may include a single room, a combination of rooms, sub-portions of a room (for example, auditorium front, auditorium stage, and auditorium balcony), and may include outdoor areas (e.g., eating areas, garden, parking lot, etc.).

As seen in exemplary FIG. 4, a building 100 includes a first floor 105 having a single zone 106, and a second floor 110 have two zones 111 and 112. Each zone 106, 111, 112 includes at least one controllable device 75a, 75b, 75c, respectively associated therewith. Each zone has one or more access points 25 associated therewith. In the example embodiment shown in FIG. 4, zone 106 includes access points 25a, 25b; zone 111 includes access points 25c, 25d, 25e; and zone 112 includes access point 25f. In use, location module 30 receives mobile device identification and signal strength data from the one or more access points 25. Location module 30 utilizes the locations of each access point 25 stored in map 51, and the signal strengths received at each access point corresponding to the same mobile device identifier, to determine the location of each uniquely-identified mobile device using three-dimensional trilateration techniques. For example, and with reference again to FIG. 4, to determine the location of an identified mobile device 15f, the relative signal strengths detected at each access point 25d, 25e, and 25a are used to establish corresponding signal radii $r_d$, $r_e$, and $r_a$ to define spheres $s_d$, $s_e$, and $s_a$ having each respective access point at its center. A stronger signal indicates a smaller radius, and vice versa. A weighting factor may be applied to compensate variations in signal strength arising from, for example, differences in signal frequency, differences in mobile device type, model, manufacturer, and so forth. The point defined by the intersection of spheres $s_d$, $s_e$, and $s_a$ indicates the position of mobile device 15f. Typically, at least three such spheres (e.g., three access points 25 in receipt of a communications signal 11 from mobile device 15) are desirable to trilaterate a position of mobile device with minimal ambiguity. For example if only two spheres are available, the target mobile device 15 may potentially be located anywhere along the circle along which the two spheres intersect. To compensate for this potential error, location module 30 may revert to a two-dimensional trilateration mode. In this two dimensional mode, only access points on the same floor are considered, and the signal radii is defined as a circle within a plane parallel to the building floor. Thus, for example, where only two access points are in receipt of a communications signal 11 from mobile device 15, the potential location of mobile device 15 is reduced to only two intersecting points of the two circles. Each of the two intersecting points is evaluated based upon its location and signal strength. If one intersecting point is a low probability area, such as an inaccessible or restricted area, or outside the building perimeter, that point is discarded and the other point is presumed to be the location of mobile device 15.

Occupancy module 40 receives from location module 30 the positions of each detected mobile device 15. Occupancy module 40 is configured to determine the number of mobile devices located within each of the control zones. The position of each detected mobile device 15 is compared to map 51 to determine in which control zone the mobile device 15 is located. The number of mobile devices 15 in each control zone is tallied to determine the occupancy of each zone.

Building controller 20 includes a rules processor 60 which is in operative communication with rules table 52 included in building database 50. Rules table 52 stores operating parameters for each control zone, such as, without limitation, a schedule defining setpoint temperature, humidity, fresh air delivery, and/or other environmental and control device settings to be imposed during a given time period. Within each time period, one or more occupancy thresholds may be defined which modify the base setpoint parameters based upon the occupancy of the zone. Additionally or alternatively, occupancy events may be defined which are triggered when an occupancy of a given zone, or a combined occupancy of two or more zones, exceeds and/or falls below a limit point. Multiple limit points and/or triggers may be defined. In one non-limiting example, a rule may be defined to lower the setpoint by two degrees and increase the flow of fresh air to a conference room if the occupancy of the conference room exceeds fifteen people. In another non-limiting example, a rule may be defined to cause an SMS message to be sent to security personnel if the total occupancy of the main floor of a building exceeds the maximum capacity set by local fire code. Rules may include a hysteresis parameter to reduce the incidence of control device settings rapidly toggling as zone occupancy varies about a threshold value. In embodiments, a minimum evaluation period may be defined such that a device control setting may be changed no more than once per minimum evaluation period.

Rules processor 60 receives zone occupancy data, e.g., the tally of occupants in each control zone, from occupancy module 40. For each control zone, the rules pertaining to the current zone for the present time period are retrieved from rules table 52 and evaluated in view of the current occupancy of the zone to determine the proper device control settings for one or more devices 75 corresponding to the zone. Rules processor 60 includes a control output 61 which is configured to control one or more controllable devices 75a, 75b, 75c of a control zone. Control output 61 includes the capability to communicate with the one or more controllable devices 75 using any suitable control protocol, including a hard-wired control circuit (e.g., a switched control circuit, an RS-485 bus, a CANBus network, a TCP/IP network, etc.), a powerline carrier control circuit (X10®, Insteon®, UPB), a wireless control protocol (Z-Wave, ZigBee, IEC 61334), and so forth.

In embodiments, during use, the one or more access points 25, location module 30, occupancy module 40, and rules processor 60 perform their tasks in a substantially continuous or real-time manner. In other embodiments, these components may operate in a periodic manner, e.g., once per minute, once every five minutes, and so forth.

Figure 2:
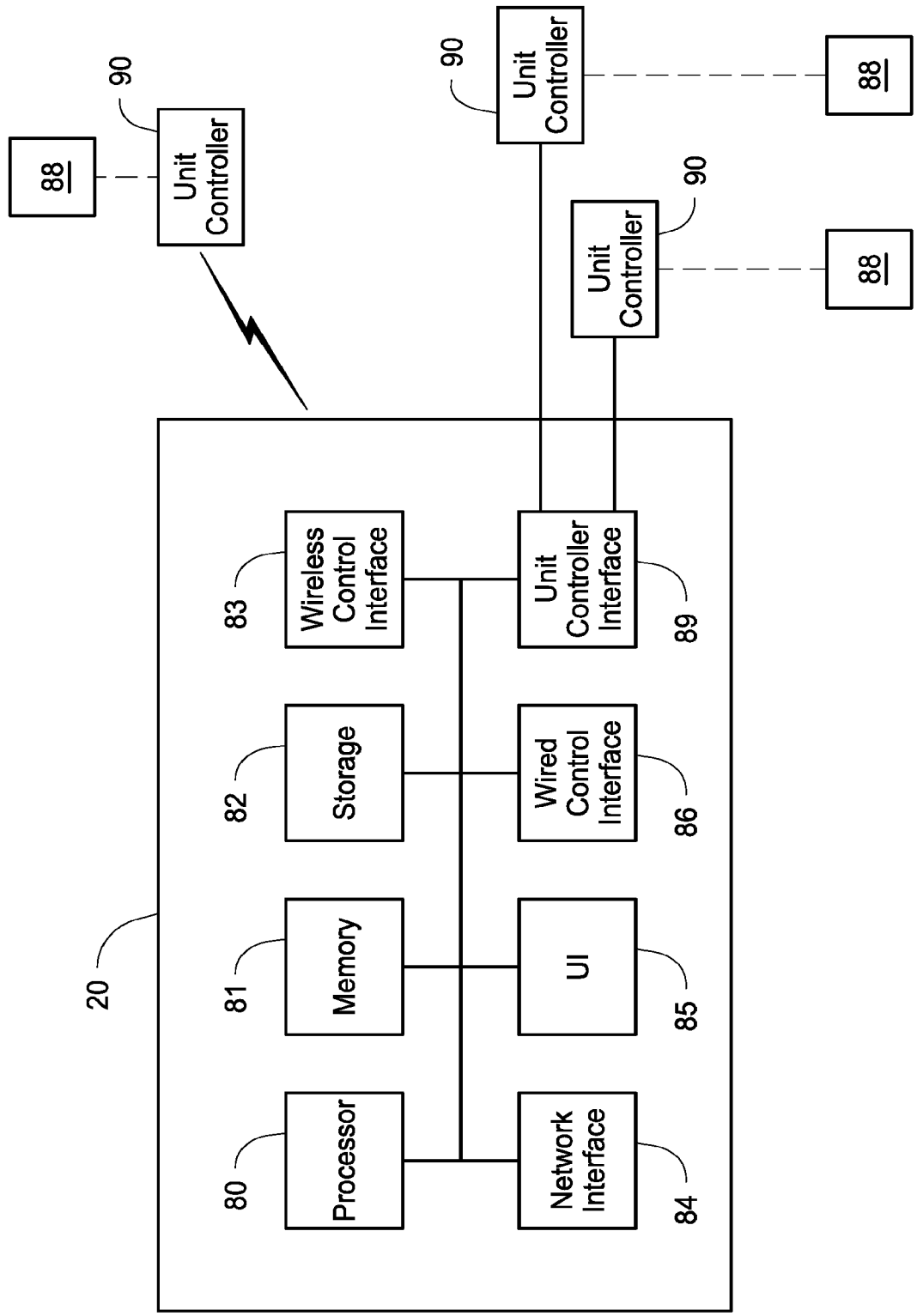
FIG. 2 is a block diagram of an embodiment of a building controller in accordance with the present disclosure.

FIG. 2 illustrates an embodiment of a building controller 20 in accordance with the present disclosure. Building controller 20 includes a processor 80 in operative communication with a memory 81, a storage device 82, a network interface 84, a user interface 85, a wireless control interface 83, a wired control interface 86, and a unit controller interface 89. Storage device 82 includes a set of instructions executable on processor 80 which, when executed by processor, perform some or all of the function of location module 30, occupancy module 40, building database 50, and/or rules processor 60, In some embodiments, storage device 82 and memory 81 includes a set of data representing functional parameters, historical data, rules, and so forth as required to implement the described features of location module 30, occupancy module 40, building database 50, and/or rules processor 60 as will be understood by one skilled in the art. Storage device 82 is non-volatile storage which survives a power cycle, and therefore storage device 82 is best suited for the storage of non-transitory data (typically firmware) and persistent data (typically configuration and historical data). Memory 81 is typically, but not necessarily, volatile storage of the type suited for computations, temporary working storage, storage of intermediate results, dynamic tables, and the like. Network interface 84 may support any suitable network communications protocol and physical network media. User Interface 85 may include a physical control panel having display and user input elements, and may additionally or alternatively include a web interface accessible using a browser in communication with controller 20 via, for example, network interface 84.

Controller 20 includes a wired control interface 86 and a wireless control interface 83 that include the capability to communicate with a controllable device 75 via a hardwired or wireless communications medium, respectively. In an embodiment, wireless control interface 83 communicates using the ZWave® wireless mesh network protocol. Controller 20 includes a unit controller interface 89 that may be utilized where a unit controller 90 is required to communicate with a controlled device 75.

Figure 2A:
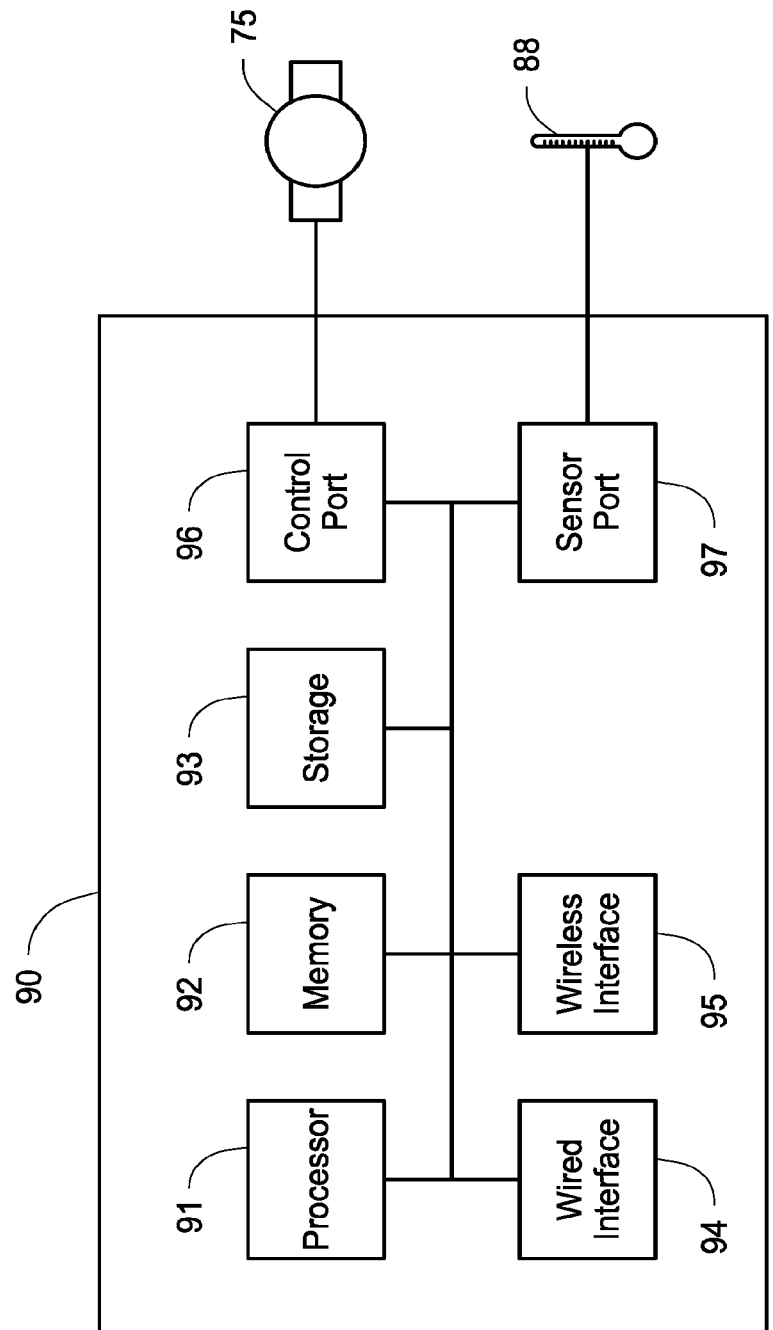
FIG. 2A is a block diagram of an embodiment of a unit controller in accordance with the present disclosure.

Turning to FIG. 2A, unit controller 90 includes in operative communication a processor 91, memory 92, storage device 93, a wired interface 94, a wireless interface 95, one or more control port(s) 96 and one or more sensor port(s) 97. Control port 75 is configured to communicate with controlled device 75 using any of a set of control protocols. Storage device 93 includes a set of instructions executable on processor 91 for accepting control commands from controller 20 at wired interface 94 and/or wireless interface 95, and translating or adapting such control commands into a form suitable for use with controlled device 75. Unit controller 90 may include configuration data stored in storage device 93 that configures control port 96 to operate with any one of a variety of controlled device(s) 75 having disparate control protocol requirements, and that configures sensor port 97 to operate with a variety of environmental sensors 88, including without limitation, temperature sensors, humidity sensors, barometric pressure sensors, light sensors, proximity sensors, and the like.

In embodiments, one or more environmental sensors 88 and/or controlled devices 75 may include an access point 25, which increases the number of potential signals available to location module 30 to accomplish trilateration. For example, an access point may be included in a thermostat, sensor, VAV box, or other HVAC component typically used throughout a building. By increasing the number of access points, the granularity of the system is improved and therefore greater positioning accuracy may be achieved. Additionally, mobile device(s) 15 may experience better overall communications performance due to the increased number of access points 25, which is an added benefit of these embodiments.

Figure 3:
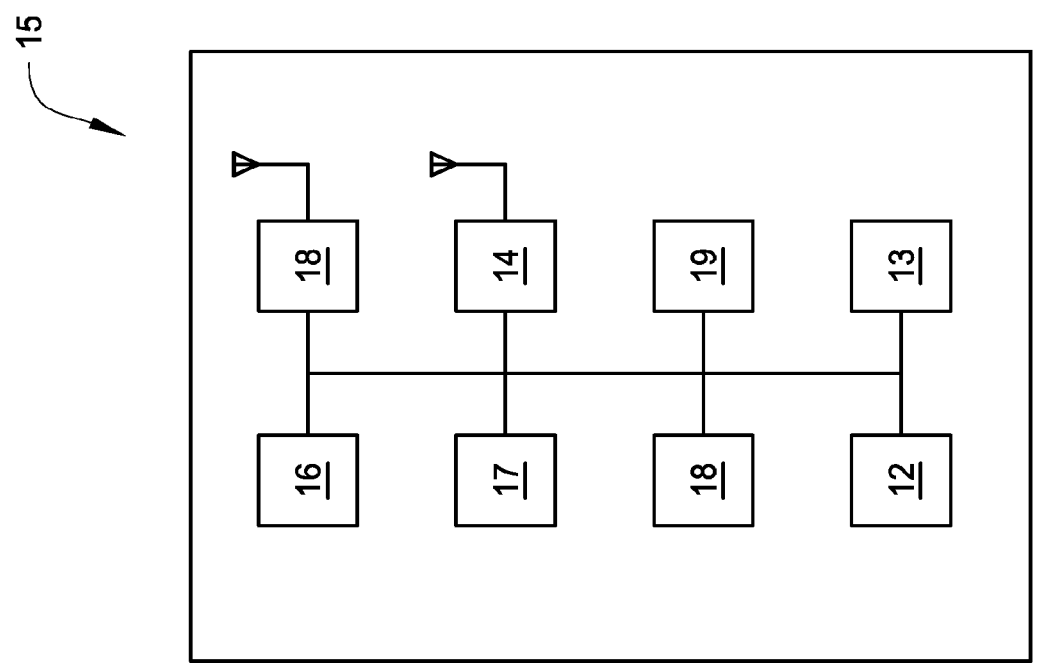
FIG. 3 is a block diagram of an embodiment of a mobile device in accordance with the present disclosure.

FIG. 3 illustrates a block diagram of a mobile device 15 in accordance with an example embodiment of the present disclosure. Mobile device 15 includes a processor 16 in operative communication with a memory 17, communications interface 18, user interface (UI) 19, and a global positioning system (GPS) receiver 14. Communications interface 18 includes the capability to communicate using one or more wireless communications protocols, such as, without limitation, cellular (e.g., GSM, CDMA, LIE, etc.), WiFi (802.11), and/or Bluetooth® protocols. In embodiments, communications interface 18 may be configured to communicate in a WiFi ad-hoc mode and, additionally or alternatively, in a WiFi infrastructure mode.

GPS receiver 14 may operate with positioning signals from any satellite navigation system now or in the future known, including GPS (United States), GLONASS (Russia), Iridium (European Union), BeiDou (China), and the like. User interface 19 may include a touchscreen display, one or more buttons, a microphone, and/or a speaker that is configured to receive user input from a user of mobile device 15 and communicate corresponding user input signals to processor 16, and, to display user interface elements to a user of mobile device 15 in response to signals received from processor 16. Mobile device 15 includes one or mole sensors 13, such as, without limitation, an accelerometer, a magnetic compass, a gyroscopic sensor, an altitude sensor (altimeter or elevation sensor), a temperature sensor, and/or a barometric pressure sensor.

Mobile device 15 includes a location-aware application 12 having executable instructions, which, when executed by processor 16, cause mobile device 16 to transmit UPS position data collected by GPS receiver 14 and/or sensor data collected by the one or more sensors 13 to location module 30. In embodiments, the UPS position data and/or the sensor data is encoded in communication signal 11, which, in turn, is received by one or more access points 25 and conveyed to location module 30. In these embodiments, the GPS position data and/or the sensor data is utilized by location unit 30 in addition to, or alternatively to, the signal strength data, to determine the position of mobile device 15. For example, in embodiments where sensor 13 of mobile device 15 includes an altimeter or barometric pressure sensor, such sensor values may be communicated to location module 30 to provide an indication of elevation, which, in turn, facilitates the determination of the building floor on which mobile device 15 is currently situated. In addition, such sensor values may be utilized to resolve positioning ambiguities which may arise when an insufficient number of access points 25 are available to accurately trilaterate a position of mobile device 15. Map 51 may define the zone boundaries and/or positions of access points 25 in terms of absolute GPS coordinates (e.g., latitude and longitude) to facilitate the determination of the position of mobile device 25. In embodiments where location module 30 receives a GPS location from mobile device 15, a communications signal 11 received at only a single access point 25 is needed to determine the location of mobile device 15. Such embodiments may be advantageously employed in a small business or residential setting, which often include only a single WiFi access point (a.k.a. WiFi router).

With reference now to FIG. 5, a flow diagram illustrating a method of operating a building control system in accordance with the present disclosure is shown. The method begins in step 210 where one or more unique mobile devices are identified. In one embodiment, the one or more mobile device are identified using a unique identifier encoded in a radiofrequency communications signal broadcast by the mobile device and received by one or more wireless access points located in the building to be controlled. In step 215, the physical location of each of the one or more mobile devices is determined. In an embodiment, the physical position of the one or more mobile devices is determined via any one of, or combinations of, trilateration of a mobile device's radiofrequency communications signal that is received by one or more wireless access point(s), receiving a UPS position of the mobile device encoded in the radiofrequency communications signal, and/or receiving positional sensor data encoded in the radiofrequency communications signal (such as, without limitation, altimeter data sensed by the mobile device). In step 220, the physical locations of each of the one or more mobile devices is mapped to the corresponding control zone of the controlled building. In embodiments, the physical location of the one or more mobile devices is compared to a stored model of the controlled building to determine in which control zone the mobile device currently resides. In step 225, the number of mobile devices in each control zone is tallied to determine the occupancy of each control zone. In step 230, the rule(s) relating to one or more controlled devices within each controlled zone are retrieved from a rules database. Each rule includes one or more instructions for adjusting the operation of a controlled device based upon the occupancy of the zone associated with the controlled device. In embodiments, a rule includes a time or scheduling instruction, which may vary the operation of the controlled device based on a time period (time-of-day, day-of-week, etc.) in view of the occupancy. In step 235, the device rule is evaluated in view of the zone occupancy for the associated zone and if a device adjustment is required, in step 240 the device is adjusted in accordance therewith. In step 245, if the rules for all controlled devices have been processed, the method concludes in step 250, otherwise, the method iterates with step 230 to process remaining devices.

ASPECTS

It is noted that any of aspects 1-15 can be combined with each other in any combination. Any of aspects 16-20 below can be combined with each other in any combination and combined with any of aspects 1-9, or any of aspects 10-15.

Aspect 1. A building system controller for a building having at least one controllable device associated with a control zone and one or more communication access points configured to receive an electromagnetic signal having a unique identifier of a mobile device, comprising a map of the building defining one or more control zones and indicating the location of each access point, a location module configured to process the electromagnetic signal received by the one or more communication access points to determine the location of the mobile device, an occupancy module configured to determine the number of mobile devices located within each of the control zones, and a rules processor having a control output configured to control a controllable device of a control zone in response to, at least in part, the number of mobile devices located within the control zone.

Aspect 2. The building system controller in accordance with aspect 1, wherein the rules processor includes a comparator which compares the number of mobile devices located within the control zone to a predetermined rule to determine the control output.

Aspect 3. The building system controller in accordance with either of aspect 1 or 2, wherein the comparator further compares the number mobile devices located within each of the control zones to a predetermined parameter selected from the group consisting of an occupancy threshold, a thermal rate, a thermal load, and a climatological condition.

Aspect 4. The building system controller in accordance with any of aspects 1-3, wherein the control output is configured to control a device selected from the group consisting of an HVAC component, a lighting module, an irrigation module, a status display, and a music playback device.

Aspect 5. The building system controller in accordance with any of aspects 1-4, wherein the location module includes a trilateration unit which compares the signal strength of a mobile device received from a first access point to the signal strength of the mobile device received from at least a second access point to determine the location of the mobile device.

Aspect 6. The building system controller in accordance with any of aspects 1-5, wherein the electromagnetic signal further includes a location indicator indicating the position of the mobile device, and the occupancy module is configured to determine the number of mobile devices located within each of the control zones based at least in part upon the location indicator included in the electromagnetic signal.

Aspect 7. The building system controller in accordance with any of aspects 1-6, wherein the electromagnetic signal further includes an elevation indicator indicating the elevation of the mobile device, and the occupancy module is configured to determine the number of mobile devices located within each of the control zones based at least in part upon the elevation indicator included in the electromagnetic signal.

Aspect 8. The building system controller in accordance with aspects 1-7, wherein the zone status is selected from the group consisting of a zone identifier, the number of mobile devices located in a zone, and a current operational status of a zone.

Aspect 9. The building system controller in accordance with aspects 1-8, wherein the rules processor is further configured to issue an alert to at least one designated user in response to, at least in part, the number of mobile devices located within the control zone.

Aspect 10. A building control system, comprising a system controller adapted for operative communication with at least one controllable device associated with a least one control zone, a geolocation module operable on mobile device configured to provide a location of the mobile device to the system controller, a map of a building defining one or more control zones of the building, an occupancy module configured to determine based at least in part upon the location of the mobile device the total number of mobile devices located within each of the at least one control zones, and a rules processor having a control output configured to control a controllable device of a control zone in response to at least in part, the total number of mobile devices located within the control zone.

Aspect 11. The building control system in accordance with aspect 10, wherein the rules processor includes a comparator which compares the number of mobile devices located within the control zone and the current time to a predetermined schedule to determine the control output.

Aspect 12. The building control system in accordance with aspect 10 or 11, wherein the comparator further compares the number mobile devices located within each of the control zones to a predetermined parameter selected from the group consisting of an occupancy threshold, a thermal rate, a thermal load, and a climatological condition.

Aspect 13. The building control system in accordance with any of aspects 10-12, wherein the control output is configured to control a device selected from the group consisting of an HVAC component, a lighting module, an irrigation module, a status display, and a music playback device.

Aspect 14. The building control system in accordance with any of aspects 10-13, further including a status display which presents a zone status to a user.

Aspect 15. The building control system in accordance with any of aspects 10-14, wherein the zone status is selected from the group consisting of a zone identifier, the number of mobile devices located in a zone, and a current operational status of a zone.

Aspect 16. A method of operating a building control system, comprising identifying one or more unique mobile devices, determining a physical location of each one of the one or more mobile devices, comparing the physical locations of each of the one or more mobile devices to a stored model of the controlled building to determine in which control zone the mobile device currently resides, tallying the number of mobile devices in each control zone to determine the occupancy of each control zone, retrieving from a rules database a rule relating a controlled device within each controlled zone, evaluating the rule in view of the zone occupancy for the associated zone to determine if an adjustment to the controlled device is required, and adjusting the controlled device in accordance with the evaluating.

Aspect 17. The method of operating a building control system in accordance with aspect 16, wherein determining a physical location includes trilateration of a radiofrequency communication signal broadcast by an identified one of the one or more unique mobile devices.

Aspect 18. The method of operating a building control system in accordance with aspect 16 or 17, wherein determining a physical location includes receiving a GPS location encoded within a radiofrequency communication signal broadcast by an identified one of the one or more unique mobile devices.

Aspect 19. The method of operating a building control system in accordance with any of aspects 16-18, wherein the evaluating step further includes evaluating the rule in view of the current time.

Aspect 20. The method of operating a building control system in accordance with any of aspects 16-19, further comprising issuing an alert to a user in response to, at least in part, the occupancy of a control zone.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A building system controller for a building having at least one controllable device associated with a control zone and one or more communication access points, the building system controller comprising:
   a processor; and
   a memory that stores executable instructions that, when executed by the processor,
      facilitate performance of operations, comprising
      receiving data from a mobile device, wherein
         the data is conveyed via an electromagnetic signal received from the mobile device at a communication access point of the communication access points, and
         the data comprises
            a unique identifier that identifies the mobile device and
            an elevation indicator indicative of an elevation of the mobile device that is determined by the mobile device,
      generating signal data, based on signal strength data for the electromagnetic signal,
      determining, based on the signal data, a position of the mobile device within the building,
      determining, based on the elevation indicator, a floor of the building for the mobile device,
      determining, based on the signal data and the floor of the building, a location of the mobile device within the building,
      determining, based on map data indicative of a map of the building defining one or more control zones, comprising the control zone, and indicating respective locations of the one or more communication access points, the control zone that serves the location,
      determining a number of mobile devices located within the control zone based at least in part on an elevation indicator received from each mobile device of the number of mobile devices, and
      controlling the at least one controllable device of the control zone in response to, at least in part, the number of mobile devices located within the control zone.

2. The building system controller in accordance with claim 1,
   wherein the controlling comprises comparing the number of mobile devices located within the control zone to a predetermined rule.

3. The building system controller in accordance with claim 2,
   wherein the comparing comprises comparing the number of mobile devices located within the control zone to a predetermined parameter selected from a group consisting of an occupancy threshold, a thermal rate, a thermal load, and a climatological condition.

4. The building system controller in accordance with claim 1,
   wherein the controlling is configured to control a device selected from the group consisting of an HVAC component, a lighting module, an irrigation module, a status display, and a music playback device.

5. The building system controller in accordance with claim 1,
   wherein the determining the location comprises performing a trilateration procedure that compares a first signal strength of a mobile device received from a first access point to a second signal strength of the mobile device received from at least a second access point to determine the location of the mobile device, and wherein the location of the mobile device is determined to be consistent with the elevation indicator.

6. The building system controller in accordance with claim 1,
   wherein
   the electromagnetic signal further includes a location indicator indicating the location of the mobile device; and
   the determining the number of mobile devices located within the control zone is based at least in part upon the location indicator included in the electromagnetic signal.

7. The building system controller in accordance with claim 1, further comprising determining a zone status is selected from a group consisting of a zone identifier, the number of mobile devices located in a zone, and a current operational status of a zone.

8. The building system controller in accordance with claim 1, further comprising, issuing an alert to at least one designated user in response to, at least in part, the number of mobile devices located within the control zone.

9. A building control system, comprising:
   a system controller adapted for operative communication with at least one controllable device associated with at least one control zone;
   an interface module configured to interface to a geolocation module operable in the building control system to receive data from a mobile device, wherein
      the data is conveyed via an electromagnetic signal received from the mobile device at a communication access point of the communication access points, and
      the data comprises
         a unique identifier that identifies the mobile device and
         an elevation indicator indicative of an elevation of the mobile device that is determined by the mobile device,
      generate signal data, based on signal strength data for the electromagnetic signal,
      determine, based on the signal data, a position of the mobile device within the building,
      determine, based on the elevation indicator, a floor of the building for the mobile device, and
      determine, based on the signal data and the floor of the building, a location of the mobile device within the building
   map data indicative of a map of a building defining one or more control zones of the building;
   an occupancy module that determines, based at least in part upon the location of the mobile device and the elevation indicator, a total number of mobile devices located within the at least one control zone; and a rules processor having a control output configured to control the at least one controllable device in response to, at least in part, the total number of mobile devices located within the at least one control zone.

10. The building control system in accordance with claim 9, wherein the rules processor includes a comparator which compares the total number of mobile devices located within the at least one control zone and a current time to a predetermined schedule to determine the control output.

11. The building control system in accordance with claim 10, wherein the comparator further compares the total number mobile devices located within the at least one control zone to a predetermined parameter selected from the group consisting of an occupancy threshold, a thermal rate, a thermal load, and a climatological condition.

12. The building control system in accordance with claim 9, wherein the control output is configured to control a device selected from the group consisting of an HVAC component, a lighting module, an irrigation module, a status display, and a music playback device.

13. The building control system in accordance with claim 9, further including a status display which presents a zone status to a user.

14. The building control system in accordance with claim 13, wherein the zone status is selected from the group consisting of a zone identifier, a number of mobile devices located in a zone, and a current operational status of a zone.

15. A method of operating a building control system, comprising:

for each mobile device of one or more mobile devices,
identifying the each mobile device of the one or more unique mobile devices,
receiving data from the each mobile device,
wherein
the data is conveyed via an electromagnetic signal received from the mobile device at a communication access point coupled to the building information system, and
the data comprises
a unique identifier that identifies the each mobile device and
an elevation indicator that is determined by the each mobile device,
determining a physical location of the each mobile device of the one or more unique mobile devices,
wherein
the determining the physical location comprises
generating signal data for the each mobile device, based on signal strength data for the electromagnetic signal from the each mobile device,
determining, based on the signal data, a position of the each mobile device of the one or more unique mobile devices within the building,
determining a building floor of the each mobile device, based on the elevation indicator for the each mobile device, and
determining, based on the signal data and the floor of the building, a respective location of the each mobile device within the building;

in response to comparing the physical location of the one or more mobile devices to a stored model of a controlled building, mapping the physical location to a control zone of the stored model;

in response to tallying a number of the one or more unique mobile devices in the control zone, determining an occupancy of the control zone;

retrieving, from a rules database, a rule relating a controlled device within the control zone;

in response to evaluating the rule in view of the occupancy, determining that an adjustment to the controlled device is indicated; and adjusting the controlled device in accordance with the evaluating.

16. The method of operating a building control system in accordance with claim 15, wherein determining a physical location includes trilateration of a radiofrequency communication signal broadcast by an identified one of the one or more unique mobile devices.

17. The method of operating a building control system in accordance with claim 15, wherein determining a physical location includes receiving a GPS location encoded within a radiofrequency communication signal broadcast by an identified one of the one or more unique mobile devices.

18. The method of operating a building control system in accordance with claim 15, wherein the evaluating the rule further includes evaluating the rule in view of a current time.

19. The method of operating a building control system in accordance with claim 15, further comprising issuing an alert to a user in response to, at least in part, the occupancy of a control zone.

20. The method of operating a building control system in accordance with claim 15, wherein the mapping the physical location to the control zone is based at least in part on the elevation indicator.

* * * * *